(12) United States Patent
Entwistle et al.

(10) Patent No.: US 7,770,687 B2
(45) Date of Patent: Aug. 10, 2010

(54) HYDRAULIC STEERING

(75) Inventors: Richard Thomas Entwistle, Sydals (DK); Carl Christian Dixen, Sydals (DK); Steve Crow, Soenderborg (DK)

(73) Assignee: Sauer-Danfoss Aps, Nordborg (DK)

( * ) Notice: Subject to any disclaimer, the term of this patent is extended or adjusted under 35 U.S.C. 154(b) by 468 days.

(21) Appl. No.: 11/740,371

(22) Filed: Apr. 26, 2007

(65) Prior Publication Data

US 2007/0251755 A1    Nov. 1, 2007

(30) Foreign Application Priority Data

Apr. 28, 2006   (DE)  ................. 10 2006 019 803

(51) Int. Cl.
*B62D 5/06* (2006.01)
(52) U.S. Cl. .................. 180/417; 180/403; 180/421
(58) Field of Classification Search ............. 180/403, 180/405, 406, 417, 421
See application file for complete search history.

(56) References Cited

U.S. PATENT DOCUMENTS

| | | | |
|---|---|---|---|
| 4,535,678 A * | 8/1985 | Thomsen et al. | 91/29 |
| 5,747,950 A * | 5/1998 | Friedrichsen et al. | 318/5 |
| 6,039,133 A * | 3/2000 | Zulu | 180/6.64 |
| 6,102,150 A * | 8/2000 | Bohner et al. | 180/403 |
| 6,285,936 B1 * | 9/2001 | Bohner et al. | 701/41 |
| 6,354,393 B1 * | 3/2002 | Ahlert et al. | 180/403 |
| 6,612,393 B2 * | 9/2003 | Bohner et al. | 180/405 |
| 6,698,542 B2 * | 3/2004 | Nishizaki et al. | 180/403 |
| 6,712,176 B2 * | 3/2004 | Zenker et al. | 180/403 |

FOREIGN PATENT DOCUMENTS

| | | | |
|---|---|---|---|
| DE | 198 44 331 A1 | | 4/2000 |
| DE | 19844331 A1 | * | 4/2000 |
| DE | 101 01 827 A1 | | 7/2002 |

* cited by examiner

*Primary Examiner*—Lesley Morris
*Assistant Examiner*—Michael R Stabley
(74) *Attorney, Agent, or Firm*—McCormick, Paulding & Huber LLP

(57) ABSTRACT

The invention concerns a hydraulic steering with a steering motor arrangement having at least one steering motor, and with at least two steering circuits, each having a steering valve that interrupts a path from a pressure supply to the steering motor arrangement in the neutral position and releases a path from the pressure supply to the steering motor arrangement on a movement out of the neutral position. It is endeavored to simplify the embodiment of such a steering. For this purpose, the steering valve (5a, 5b) has two end positions, one on each side of the neutral position, in which positions a path from the pressure supply (15, 21) to the steering motor arrangement (2) is interrupted.

13 Claims, 2 Drawing Sheets

HYDRAULIC STEERING

CROSS REFERENCE TO RELATED APPLICATIONS

Applicant hereby claims foreign priority benefits under U.S.C. §119 from German Patent Application No. DE 10 2006 019 803.4 filed on Apr. 28, 2006, the contents of which are incorporated by reference herein.

FIELD OF THE INVENTION

The invention concerns a hydraulic steering with a steering motor arrangement having at least one steering motor, and with at least two steering circuits, each having a steering valve that interrupts a path from a pressure supply to the steering motor arrangement in the neutral position and releases, in dependence of the direction, a path from the pressure supply to the steering motor arrangement on a movement out of the neutral position.

BACKGROUND OF THE INVENTION

Such a steering is, for example, known from U.S. Pat. No. 6,102,150.

The invention concerns a so-called "steer-by-wire" steering, in which a steering member does not act directly upon the steering motor arrangement, but firstly generates a signal, which again activates a steering valve controlling the supply of hydraulic fluid to the steering motor arrangement.

For safety reasons, it is often necessary to provide several steering circuits or at least several steering valves in such steer-by-wire steering systems. If one of the steering valves does not work properly, the other steering valve is activated, so that the vehicle can still be steered.

In the case known from U.S. Pat. No. 6,102,150, each steering circuit is provided with an additional valve, which interrupts or releases the steering circuit. This additional valve can be located in the flow direction upstream or downstream of the respective steering valve. When a changing over from one steering valve to the other is desired, both additional valves should possibly be changed over simultaneously, meaning on the one hand that the vehicle remains steerable, on the other hand, however, that the fault in one steering valve cannot get through to the other steering valve. Realising this, however, requires relatively large efforts.

SUMMARY OF THE INVENTION

The invention is based on the task of simplifying the design of such a steering.

With a hydraulic steering as mentioned in the introduction, this task is solved in that the steering valve has two end positions, one on each side of the neutral position, in which positions a path from the pressure supply to the steering motor arrangement is interrupted.

With this embodiment an additional valve in the steering circuits is no longer required. This is based on the assumption that in steering valves typically two types of errors occur. Firstly, the steering valve may "get stuck", that is, remain in its neutral position, also when signals act upon the steering valve, which should cause an opening of the steering valve in one steering direction or the other. If such a fault occurs, the control of the steering will, as known from the state of the art, be taken over by the other steering valve. The steering motor arrangement cannot be acted upon by the steering valve being in its neutral position, as the connection from the pressure supply to the steering motor arrangement is interrupted. The term "interrupted" does not necessarily mean a physical interruption, which cuts off the flow of hydraulic fluid from the pressure supply to the steering motor arrangement, if this is preferred. It is sufficient, if the corresponding steering valve handles the hydraulic fluid from the pressure supply so that the steering valve being in its neutral position has no possibility of acting upon the steering motor arrangement. Another fault, which is typical in connection with steering valves, is that a movement control signal does not make the steering valve stop in a predetermined position, but takes the steering valve to an end position, which is limited by physical conditions, for example a stop. Also in this kind of end position the hydraulic fluid shall no longer be able to reach the steering motor arrangement through the steering valve. The steering is then automatically taken over by the respective other steering valve. In this way an additional valve is no longer required in the steering circuits. On the contrary, the safety function is taken over by the steering valves themselves.

Preferably, the steering valves are made as pilot-controlled steering valves. This is a simple possibility of, in a manner of speaking, remote-controlling the steering valves, that is, to act upon the steering valves with hydraulic signals so that they let the desired amount of hydraulic fluid pass from the pressure supply to the steering motor arrangement.

Preferably, a pilot control valve is allocated to each steering valve. This gives additional safety. A fault in a pilot controlled valve will not influence all steering valves, but only the steering valve connected to the corresponding pilot control valve. The other steering valve can continue to work independently.

It is preferred that each pilot control valve has its own actuator. Also this is an additional safety measure. A fault in an actuator can be accepted without problems. This fault will cause that the corresponding pilot valve, and thus also the connected steering valve, will no longer work properly. As, however, a further steering circuit is available, such a situation is uncritical.

Preferably, each steering valve has a position sensor. Thus, a control can be realised, which activates the pilot control valve in dependence of the position of the steering valve, so that the steering valve can be operated with a high accuracy in such a manner that the desired amount of hydraulic fluid reaches the steering motor arrangement.

Preferably, the steering valve has a spring arrangement taking it to the neutral position. Thus, the neutral position is defined and fixed without being influenced by external forces. When the steering valve has to be activated after an inactive phase, but is stuck because of a fault, the steering valve is in the neutral position, in which the path from the pressure supply to the steering motor arrangement is interrupted.

Preferably, the steering valve is a 5-position valve. Firstly, it has the neutral position and the two end positions, in which the path from the pressure supply to the steering motor arrangement is interrupted. Between the neutral position and one end position on the one side and the neutral position and the other end position on the other side, an area exists, which is also called "position" for short. In each of these areas, depending on the direction, the steering valve opens one or more throttles more or less, in dependence of its activation to control the flow of hydraulic fluid from the pressure supply to the steering motor arrangement. Preferably, in this connection, the steering valve is made as a slide valve.

Preferably, a control device is provided, which controls at least two steering valves at the same time. This has several advantages. Firstly, both steering valves are activated at the same time for each steering operation, so that the probability of a stuck steering valve is kept small. Secondly, each steering valve is only loaded with a share of its capacity, which is favourable for its life. Further, in case of a fault, such a control device ensures a faster reacting system, as a change-over from one steering valve to the other is not required.

Preferably, the pressure supply has several pumps. This increases the safety of the pressure supply.

Preferably, the pumps are connected to inlets of an automatic selection device, whose outlet is connected to the steering circuits. In the simplest case, such a selection device can be a change-over valve that passes on the higher of the pressures at its inlets to the steering circuits. With such a selection device the time needed for changing over from one pump to the other in connection with pump failure can be kept short.

Preferably, one of the pumps is driven by a combustion engine and the other pump is driven by an electric motor or a wheel, the pump driven by the combustion engine being a variable displacement pump. This will keep the energy consumption of the combustion engine small, as the pump only has to perform in accordance with the requirements of the steering.

It is preferred that the variable displacement pump has a load-sensing inlet, which is connected to an electrically activated load-sensing control valve. Thus, the load-sensing valve is also activated by the control device, so that the control device can also simulate a pressure that does not correspond to the pressures in the steering circuits. This gives further influencing possibilities.

Preferably, the steering motor arrangement has a steering motor that is connected to at least two steering circuits. Here, it is considered that the steering motor is usually the least fault-susceptible element of the steering. One single motor will be sufficient, if it is ensured that the steering valves can act upon the motor in common or individually, and that a fault in a steering valve will cause no negative influencing through the corresponding steering valve.

In the following, the invention is described on the basis of preferred embodiments in connection with the drawings, showing:

DETAILED DESCRIPTION OF THE PREFERRED EMBODIMENTS

Figure 1:
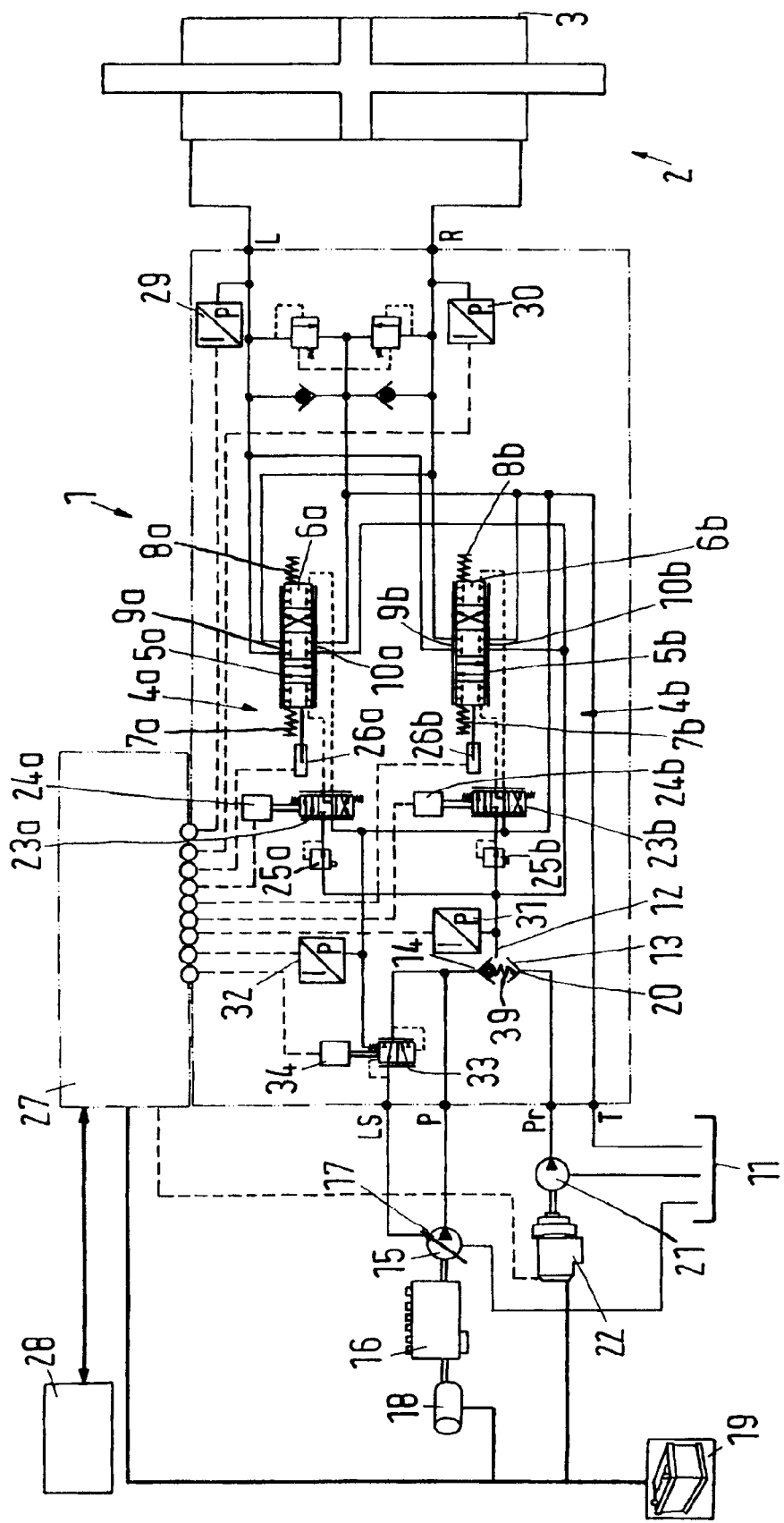
FIG. 1 a schematic view of a hydraulic steering
FIG. 2 a schematic view of a steering circuit
FIG. 3 a schematic view explaining the reaction time.

FIG. 1 shows a hydraulic steering 1 with a steering motor arrangement 2, which has in the present case one single steering motor 3. The steering motor 3 has two connections L, R.

The steering motor 3 is controlled via two steering circuits 4a, 4b, each having a steering valve 5a, 5b. Each steering valve 5a, 5b has a slide 6a, 6b, which is kept in a neutral position by springs 7a, 8a, 7b, 8b. Preferably, the steering valves 5a, 5b are proportional valves.

Each steering valve 5a, 5b has an outlet 9a, 9b, which is connected to the steering motor 3. Further, each steering valve 5a, 5b has an inlet 10a, 10b, which is connected to a tank 11 via a low-pressure connection T and on the other side to an outlet 12 of a change-over valve 13.

The change-over valve 13 has a first inlet 14, which is connected to a pressure connection P of a first pump 15. The first pump 15 is driven by a combustion engine 16. The first pump 15 has a displacement device 17. The combustion engine 16 drives a generator 18, by means of which a vehicle battery 19 can be charged.

The change-over valve 13 has a second inlet 20 that is connected to a second pump 21, which is driven by an electric motor 22. The electric motor 22 is supplied by the vehicle battery 19 or the generator 18. Instead of an electric motor 22 as drive for the second pump 21, also a vehicle wheel can be used.

The change-over valve 13 has a spring 39, which biases a valve element so that it closes the first inlet 14 in the pressureless state. As the pressure supply takes place mainly via the first pump 15, the valve element is moved against the force of the spring 39 on each start of the first pump 15. In this way it can be prevented that it "gets stuck".

A pilot control valve 23a, 23b is allocated to each steering valve 5a, 5b. Each pilot control valve 23a, 23b has an actuator 24a, 24b, with which the pilot control valve 23a, 23b can be displaced.

Each pilot control valve 23a, 23b is connected to the outlet 12 of the change-over valve 13 via a pressure control valve 25a, 25b. The pressure control valve 25a, 25b ensures that the pressure supplied by the pumps 15, 21 is adjusted to a level that can be used by the pilot control valves 23a, 23b. Instead of the two pressure control valves theoretically also only one can be used. However, the system gets safer with two valves.

For each allocated steering valve 5a, 5b each pilot control valve 23a, 23b generates control pressures, with which the slide 6a, 6b of the respective pilot valve 5a, 5b can be displaced against the force of the springs 7a, 8a or 7b, 8b, respectively, to release or interrupt a path from the outlet 12 of the change-over valve 13, that is, the pressure supply, to the steering motor 3. In a manner known per se, pilot pressures acting accordingly upon the slides 6a, 6b of the steering valves 5a, 5b will displace the slides 6a, 6b from the neutral position, in which a path from the pressure supply to the steering motor arrangement 2 is interrupted, so that either the left connection L of the steering motor 3 is exposed to pressure and hydraulic fluid can flow back to the tank 11 from the right connection R, or the right connection R of the steering motor 3 is exposed to pressure and hydraulic fluid can flow back to the tank 11 from the left connection L.

The position of the slide 6a, 6b is monitored by a position sensor 26a, 26b. The position sensor 26a, 26b reports the position of the slide 6a, 6b via an interface 27 to a control device 28. Additionally, the control device 28 receives a number of pressure signals, which represent the pressures measured by the pressure sensors 29, 30 in the connections L, R, by the pressure sensor 31 in the outlet 12 of the change-over valve 13 and by the pressure sensor 32 in the tank 11. However, the "intelligence" usually provided by the control device 28 can also be located in the interface 27, so that the control circuits are made smaller, the control device 28 only providing such signals, which are caused by actions from the environment, for example the activation of a steering handwheel or a joystick.

The control device 28 controls the actuators 24a, 24b.

The displacement device 17 is connected to an electrically activated load-sensing control valve 33. The load-sensing control valve 33 is displaced by an actuator 34, which again is connected to the control device 28 via the interface 27. The inlet of the load-sensing control valve 33 is connected to the outlet of the pump 15. The load-sensing control valve 33 can also "simulate" a load-sensing pressure LS, that is, set the load-sensing pressure in dependence of other pressures, which are measured by the pressure sensors 29 to 32, so that the displacement pump 15 can always provide the required amount of hydraulic fluid. However, the system can also generate a load-sensing pressure in other ways, for example in the traditional way.

As can be seen, the two steering valves 5a, 5b are made as 5-position valves. In the neutral position shown, which is set by the springs 7a, 8a or 7b, 8b, respectively, a connection between the pumps 15, 21 and the steering motor 3 is interrupted. Also in two end positions, which are located on either side of the neutral position, such a connection is interrupted. Between the neutral position and each of the end positions, respectively, a path from the pumps 15, 21, or rather from the outlet 12 of the change-over valve 13, to the steering motor 3 and from the steering motor 3 to the tank 11 is released.

During normal operation the two steering valves 5a, 5b are operated in common, that is, each of the steering valves 5a, 5b provides approximately 50% of the available amount of hydraulic fluid required by the steering motor 3. This means that both slides 6a, 6b must always be moved in connection with a steering movement. These repeated movements prevent the slides 6a, 6b from getting stuck because of long periods of passivity.

If a slide 6a, 6b should be unable to move, the other slide 6b, 6a will be correspondingly further deflected to ensure the fluid supply to the motor 3. A stuck slide 6a, 6b is a typical fault in a steering valve.

Another fault, which can occur in the steering valves 5a, 5b, is an incorrect control by the pilot control valves 23a, 23b. In this case the slide 6a, 6b is, in a manner of speaking, deflected to the end position, in which a further movement is merely prevented by mechanical stops. Also in this case the corresponding steering valve 5a, 5b interrupts the connection between the pumps 15, 21 and the steering motor 3, so that also in this case interferences cannot occur. The hydraulic fluid required will be supplied by the respective other steering valve 5b, 5a.

Figure 2:
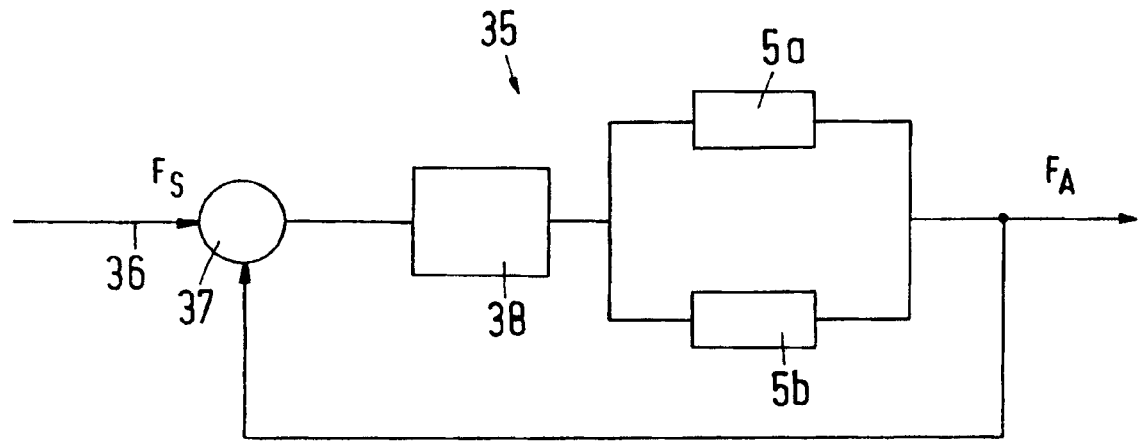

The above will be explained by means of FIG. 2, which is a schematic view of a corresponding control circuit 35.

Via an inlet 36 the control circuit 35 receives the desired value $F_S$ of the flow required to control the steering motor 3. By means of the sensors 29, 30, which are made as pressure sensors, and the position of the slides 6a, 6b of the steering valves 5a, 5b, working as proportional slides, the actual flow $F_A$ is determined and reported to a summing point 37. From a difference between the desired value $F_S$ and the actual value $F_A$ a controller 38 determines control signals for the two steering valves 5a, 5b. If one of the steering valves 5a, 5b permits no passage of hydraulic fluid, as it is in the neutral position or one of the two end positions, the other steering valve 5b, 5a must supply the correspondingly larger amount of hydraulic fluid.

Figure 3:
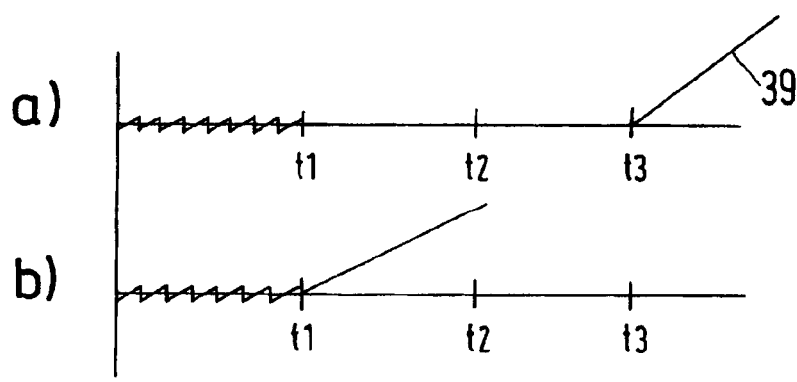

With such a system a correspondingly faster reaction of the steering 1 is permitted, if a fault occurs. This will be explained by means of FIG. 3. FIG. 3a shows the procedure in a traditional steering. At a time t1 a fault occurs, which is recognised at a time t2. At a time t3 a change-over has taken place, so that, from the time t3 hydraulic fluid can be supplied to the steering motor via the other steering circuit, as indicated by a schematically shown line 39.

If the same situation occurs in the steering shown in FIG. 1, the control circuit 35 recognises this already at the time t1, and the respective other steering valve also starts equalising the error at the time t1.

In a manner not shown in detail display means can of course be provided, which show the driver that a fault has occurred.

If, instead of the one steering motor 3, a steering motor for each steering circuit is used, it may be expedient, in the neutral position and in the two end positions, not to cause the shown interruption of the path between the pumps 15, 21 on the one side and the steering motor arrangement 2, but to short-circuit the connections of the connected steering motor.

In a manner not shown in detail, additional valve functions can be provided, by means of which malfunctioning pilot valve 23a, 23b can be disconnected from the pressure supply in case of a fault in an actuator 24a, 24b. These valve functions can be integrated in the valve 33, which is then not, as shown, made as a 2-position valve but, for example, as a 4-position valve. Two positions then correspond to the position possibilities shown in FIG. 1. In a third position only the pilot control valve 23a is supplied. If required, then also only the allocated steering valve 5a is supplied. In the fourth position only the pilot control valve 23b and, if required, only the steering valve 5b are supplied.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic steering with a steering motor arrangement having at least one steering motor, and with at least two steering circuits, each having a steering valve that interrupts a path from a pressure supply to the steering motor arrangement in the neutral position and releases, in dependence of the direction, a path from the pressure supply to the steering motor arrangement on a movement out of the neutral position, characterised in that the steering valve has two end positions, one on each side of the neutral position, in which positions a path from the pressure supply to the steering motor arrangement is interrupted.

2. The steering according to claim 1, wherein the steering valves are made as pilot-controlled steering valves.

3. The steering according to claim 2, wherein a pilot control valve is allocated to each steering valve.

4. The steering according to claim 3, wherein each pilot control valve has its own actuator.

5. The steering according to claim 1, wherein each steering valve has a position sensor.

6. The steering according to claim 1, wherein the steering valve has a spring arrangement taking it to the neutral position.

7. The steering according to claim 1, wherein the steering valve is a 5-position valve.

8. The steering according to claim 1, wherein a control device is provided, which controls at least two steering valves at the same time.

9. The steering according to claim 1, wherein the pressure supply has several pumps.

10. The steering according to claim 9, wherein the pumps are connected to inlets of an automatic selection device whose outlet is connected to the steering circuits.

11. The steering according to claim 9, wherein one of the pumps is driven by a combustion engine and the other pump is driven by an electric motor or a wheel, the pump driven by the combustion engine being a displacement pump.

12. The steering according to claim 11, wherein the displacement pump has a load-sensing inlet, which is connected to an electrically activated load-sensing control valve.

13. The steering according to claim 1, wherein the steering motor arrangement has a steering motor that is connected to at least two steering circuits.

* * * * *